A. WIETING.
Nut.

No. 200,959. Patented March 5, 1878.

Attest:
H. D. Penine
D. P. Cowl

Inventor:
Archibald Wieting
By Wm H Finckel
Attorney.

UNITED STATES PATENT OFFICE.

ARCHIBALD WIETING, OF FORT PLAIN, NEW YORK, ASSIGNOR OF ONE-HALF HIS RIGHT TO ALPHONSO WALRATH, OF SAME PLACE.

IMPROVEMENT IN NUTS.

Specification forming part of Letters Patent No. 200,959, dated March 5, 1878; application filed June 12, 1877.

*To all whom it may concern:*

Be it known that I, ARCHIBALD WIETING, of Fort Plain, in the county of Montgomery, in the State of New York, have invented certain new and useful Improvements in the Construction of Nuts, of which the following is a full, clear, and exact description.

Nuts have heretofore been produced which have their screw-threads formed therein in the process of casting, a core being used for this purpose. Such nuts have been provided with cylindrical threaded holes, and half-nuts have been made having a semi-cylindrical threaded portion.

As distinguished from such devices, my invention consists in a nut molded in sand, and cast as are other articles of metal, and having its screw-threads formed in the process of casting, which screw-threads are distributed on opposite sides of a longitudinal plane, two sections of such threads being on one side of such plane and one on the other, separated from one another, but forming a continuous thread for the reception and operation therein of a screw.

Figure 1:
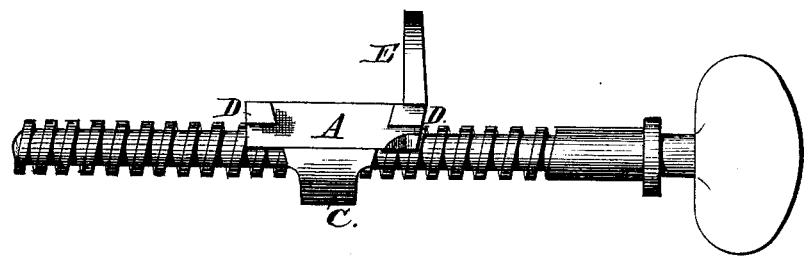
Figure 2:
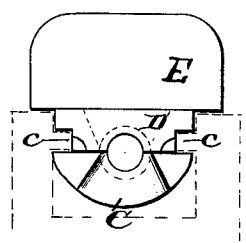
Figure 3:
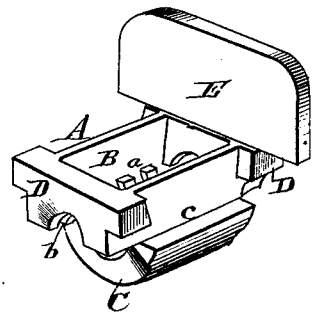
Figures 4, 5:
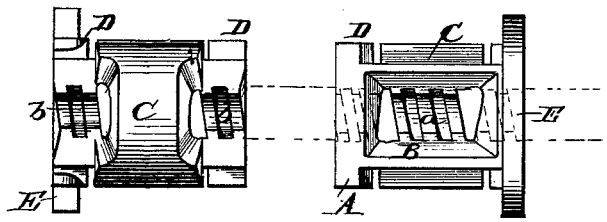

In the drawings illustrating my invention, Figure 1 is a side elevation of a nut with a screw inserted therein. Fig. 2 is an end view of such nut. Fig. 3 is a perspective view; Fig. 4, a top view, and Fig. 5 a bottom view.

The letter A designates my nut. A recess, B, is formed in its upper surface, beneath which is a bridge, C, and in the face of this bridge are formed the screw-threads $a$ of any shape, constituting, for instance, one-half of the entire number of threads the nut is to receive. The upper or inner face of the bridge C, which contains the threads, is semi-cylindrical in shape, and the threads consequently partake of this configuration. D D are extensions on each side of the recess B above the ends of the bridge C. In the under surfaces of these extensions D D the threads $b\ b$ are formed, which threads make up the other half necessary to complete a nut. The threads $b\ b$ may constitute one half of a tubular threaded orifice in a nut, of which the threads in the bridge C form the other, as before described.

A nut constructed as above described is easily molded and cast with its screw-threads complete. It can be produced at small cost, and is very strong. It is applicable in bench or other screw clamps, (see Figs. 1 and 2,) and in very many other machines.

By reason of the distribution of the screw-threads on opposite sides of a plane, and their consequent separation, the screw is not subjected to a strain condensed within a small compass, and the thread-stripping tendency is greatly diminished.

Nuts cast in accordance with my invention may be oblong, round, square, or other shape, so far as the shape is capable of receiving one portion, equally divided, of the threads on its ends, and the remaining portion between these ends, so as to constitute a continuous threaded orifice.

I have described the threads as equally divided between the end extensions and a bridge intermediate thereof; but, of course, I do not wish to limit my invention to such construction.

It is obvious, further, that nuts of this character may have the threads cut or otherwise formed therein; but the invention is specially applicable and useful in casting nuts, the object being primarily to cheapen their production.

For use in some clamps the nut may be constructed with a cheek-piece, E, and grooves $c\ c$.

By the use of my invention elongated nuts may be easily and cheaply made, with their screw-threads finished and complete. They are simply molded in sand, in the ordinary mode of sand-molding other articles, and cast without the use of cores or other expensive and intricate media.

By the use of my invention, also, long nuts movable upon a screw, and serving as carriers for material in bench-clamps, presses, miter-machines, and many other machines, can be produced at a cost greatly less than by the old method or any other method known to me.

I have found that, to obtain a nut and screw such as I have shown in the drawings hereunto annexed by the old methods, the cost will be for a pair one dollar and fifty cents, while by my method a better article can be had for about three cents a pair. In the old method the nut-blank, however produced, must be finished by reaming and cutting the thread. By my method the nut is finished as it comes from the mold, except, perhaps, some necessary trimming off of fins incident to casting.

Another advantage arising from my form of nut is, that the screw-threads are readily accessible for lubricating.

Having thus described my invention, what I claim is—

A cast nut for use in miter and other machines, constructed with the recess B, threaded bridge C, and threaded extensions D D, arranged substantially as described, and having its threads formed complete and finished in the process of casting.

The above specification signed this the 7th day of June, A. D. 1877.

ARCHIBALD WIETING.

Witnesses:
M. E. WELLER,
P. A. WIETING.